United States Patent [19]

Markey et al.

[11] Patent Number: 5,551,371
[45] Date of Patent: Sep. 3, 1996

[54] PET ENCLOSURE FOR HOUSING A PET ENABLING PASSING IN AND OUT OF THE ENCLOSURE

[75] Inventors: Dennis P. Markey; Joe Pietranton; Nick Nagy, all of Warren, Mich.; Rick Garton, Fort Wayne, Ind.; Philip Swinhart, Fort Wayne, Ind.; Ron Rensberger, Fort Wayne, Ind.; Walter Herbst, Chicago, Ill.

[73] Assignee: Handy Home Products, Inc., Warren, Mich.

[21] Appl. No.: 183,024

[22] Filed: Jan. 18, 1994

(Under 37 CFR 1.47)

[51] Int. Cl.⁶ ........................................ A01K 1/02
[52] U.S. Cl. .................... 119/499; 119/165; 119/482
[58] Field of Search ........................ 119/19, 165, 15, 119/28.5

[56] References Cited

U.S. PATENT DOCUMENTS

| | | | |
|---|---|---|---|
| 920,975 | 5/1909 | Minion | 119/19 |
| 1,538,368 | 5/1925 | Youngberg | 119/19 |
| 3,460,516 | 8/1969 | Leonard . | |
| 3,490,417 | 1/1970 | Swinney | 119/19 |
| 3,710,761 | 1/1973 | Gregory | 119/19 |
| 3,941,092 | 3/1976 | Winters | 119/19 |
| 3,982,500 | 9/1976 | Marlatt . | |
| 4,006,713 | 2/1977 | Hawley . | |
| 4,195,593 | 4/1980 | Dunn . | |
| 4,219,970 | 9/1980 | DeGidio . | |
| 4,366,773 | 1/1983 | Johanneck | 119/19 |
| 4,367,695 | 1/1983 | Lance . | |
| 4,735,173 | 4/1988 | Dubreuil | 119/19 |
| 4,764,146 | 8/1988 | Auer et al. . | |
| 4,852,520 | 8/1989 | Goetz | 119/19 |
| 5,081,956 | 1/1992 | Greitzer et al. . | |
| 5,115,762 | 5/1992 | Long . | |
| 5,121,710 | 6/1992 | Gonzalez . | |
| 5,140,948 | 8/1992 | Roberts | 119/19 |
| 5,148,768 | 9/1992 | Hinton | 119/19 |
| 5,154,137 | 10/1992 | Stanaland | 119/19 |
| 5,184,575 | 2/1993 | Reinartz . | |

OTHER PUBLICATIONS

Sibley, "Seven Ways to Build Comfortable Dog House", *Popular Science Monthly*, New York, p. 63, Sept. 1936.

*Primary Examiner*—Todd E. Manahan
*Attorney, Agent, or Firm*—Harness, Dickey & Pierce, P.L.C.

[57] ABSTRACT

A pet enclosure has a generally hollow box shaped base and a roof which is hingedly attached to the base. The hinged roof allows simplified access to the interior of the pet enclosure for cleaning, whelping or the like. The roof of the pet enclosure includes a chimney within which is located a passive vent which can be opened or closed to allow air flow through the pet enclosure to be controlled. A further embodiment of the pet enclosure includes an optional plastic curtain door and/or a solar powered vent fan which replaces the passive vent.

21 Claims, 4 Drawing Sheets

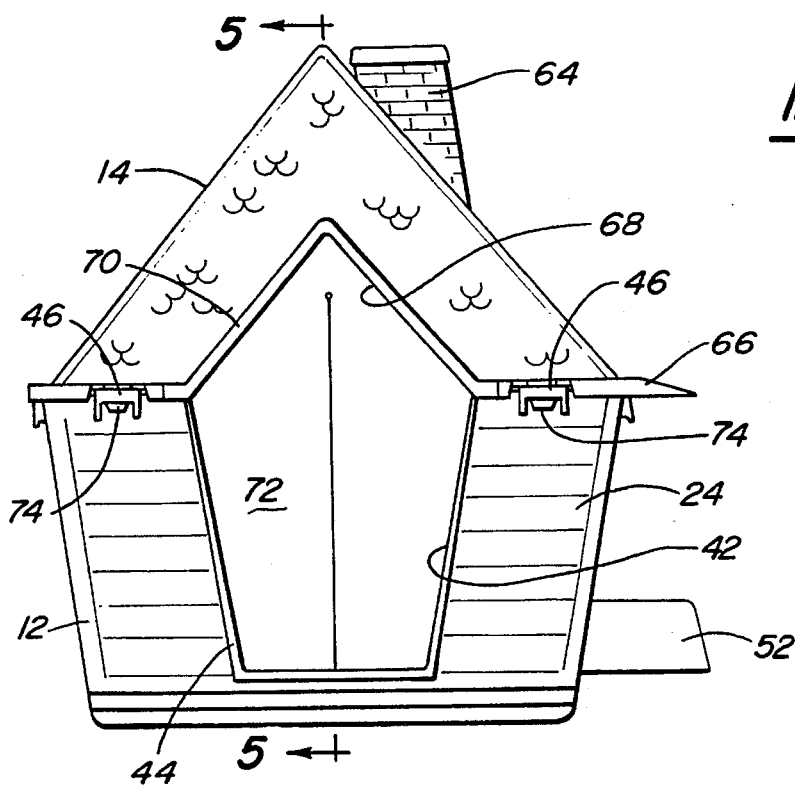

PET ENCLOSURE FOR HOUSING A PET ENABLING PASSING IN AND OUT OF THE ENCLOSURE

FIELD OF THE INVENTION

The present invention relates to a pet enclosure adapted to provide a comfortable environment for the pet. More particularly, the present invention relates to a multi-component gable styled doghouse which can be easily assembled and maintained.

BACKGROUND OF THE INVENTION

Many pet owners who desire to keep their pets outdoors, or those who desire that their pet have a place of its own indoors, provide pet enclosures for their pets. These pet enclosures are usually particularly heavy and sturdy to prevent the pet from disassembling it or to prevent the pet from pushing it around the owner's yard. The typical pet enclosure is formed from some type of wood panels which are permanently or releasably attached together. While these type of pet enclosures can provide an attractive appearance, they are often difficult to clean and therefore often become malodorous or they begin to rot due to water damage. In addition, any access to the interior of the pet enclosure is usually limited to the pet entrance. This severely limits safe access to the interior of the pet enclosure especially when the pet enclosure is being used as a whelping house.

Accordingly, what is :needed is a pet enclosure which is attractive, functional and generally impervious to the elements of nature. The pet enclosure should offer a comfortable environment for the pet while at the same time provide the desired convenience to the pet owner.

SUMMARY OF THE INVENTION

The present invention provides the art with a two piece pet enclosure which includes a generally hollow box shaped base which hingedly supports a gabled roof. The hinging of the gabled roof provides unlimited access to the interior of the pet enclosure for cleaning or whelping. Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a front elevational view of the pet enclosure shown in FIG. 1;

FIG. 3 is a side elevational view of the pet enclosure shown in FIG. 1;

DETAILED DESCRIPTION OF THE PREFERRED EMBODIMENT

Figure 1:
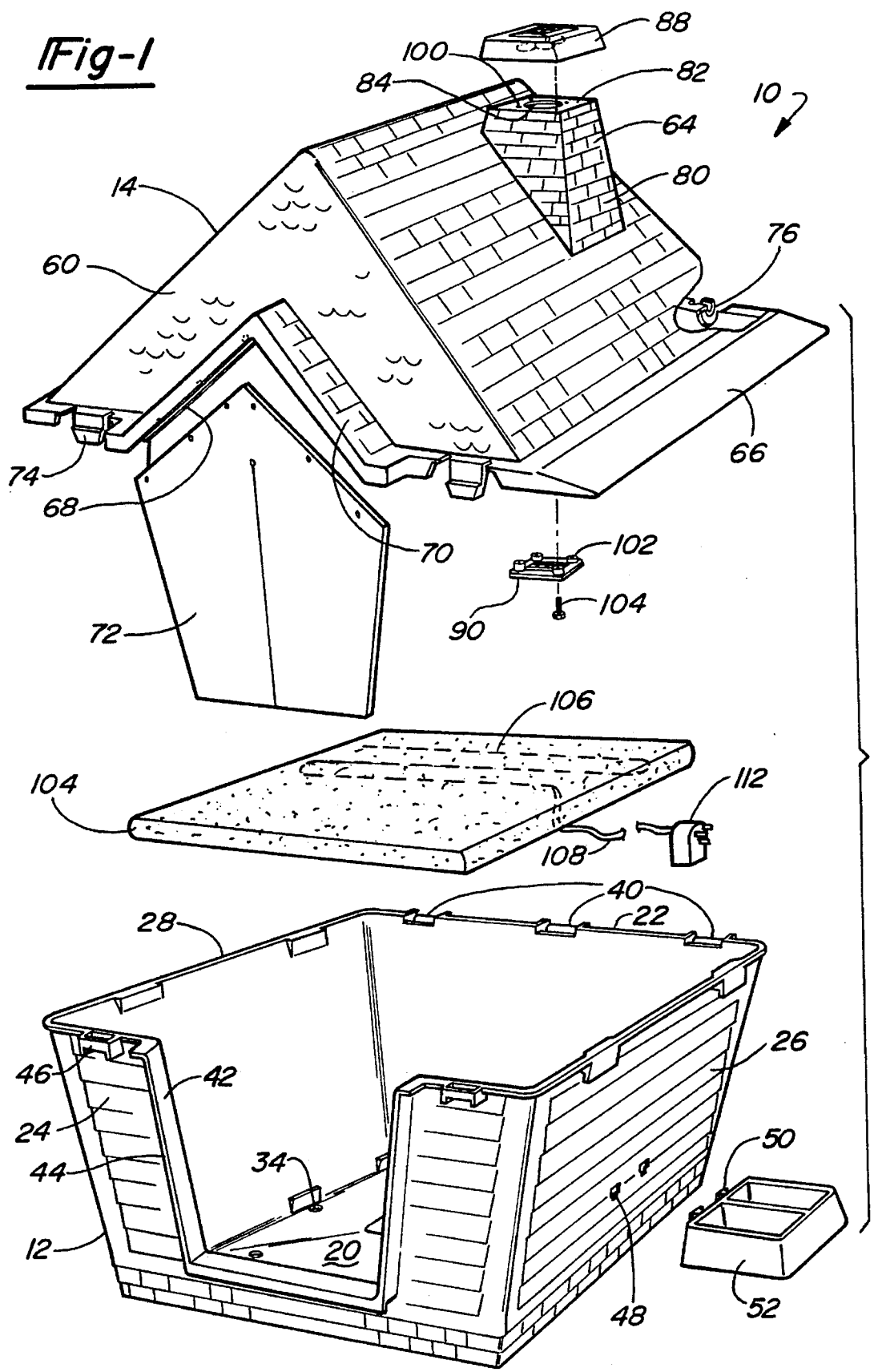
FIG. 1 is an exploded perspective view of the pet enclosure according to the present invention.
Figure 4:
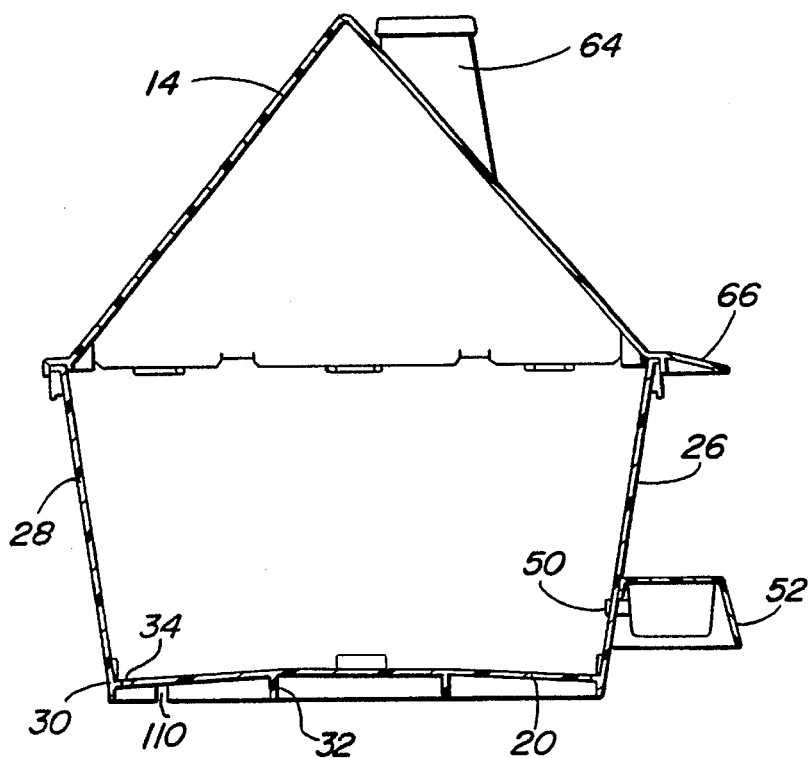
FIG. 4 is an end sectional view in the direction of arrows 4—4 shown in FIG. 3.
Figure 5:
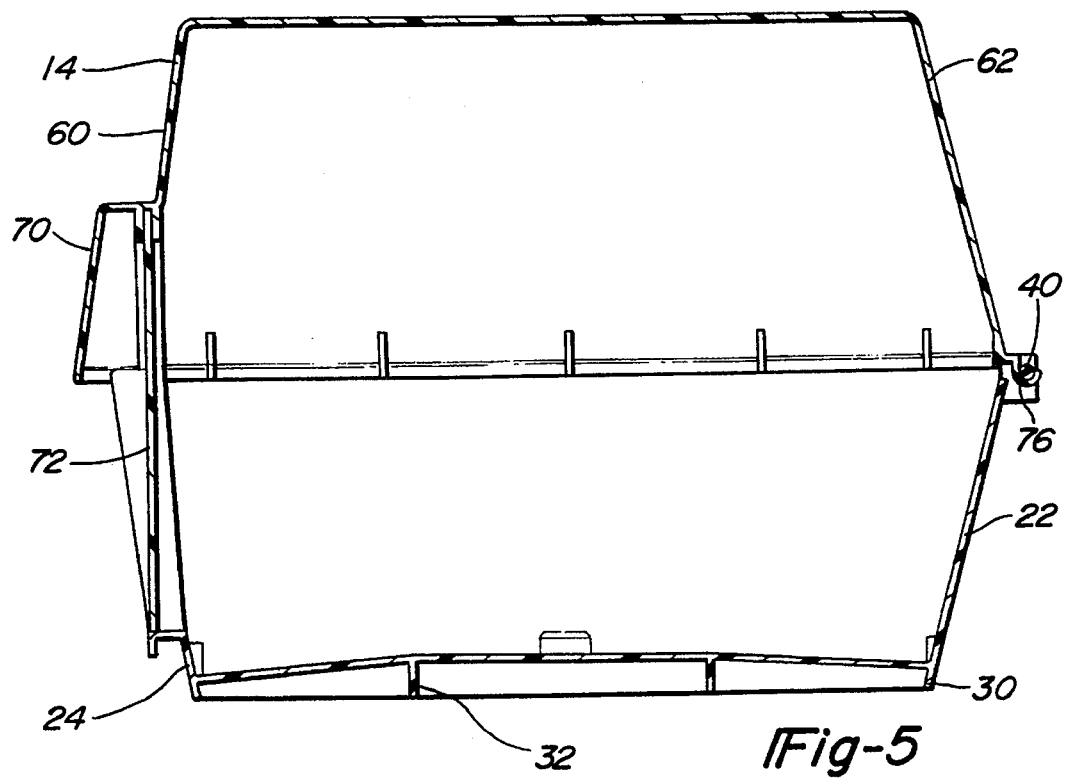
FIG. 5 is a side sectional view in the direction of arrows 5—5 shown in FIG. 2.

Referring now to the drawings in which like reference numerals designate like or corresponding parts throughout the several views, there is shown in FIGS. 1 through 5, a pet enclosure according to the present invention which is designated generally by the reference numeral 10. Pet enclosure 10 comprises a base 12 and a roof 14.

Base 12 is a hollow box like structure having a floor 20, a back wall 22, a front wall 24 and two side walls 26 and 28. Floor 20 is elevated from the supporting surface by a circumferentially extending flange 30 and a centrally located generally rectangular shaped gusset 32. A plurality of drain holes 34 are provided on the outside edges of floor 20 to provide for the draining of any moisture which may accumulate within base 14. Gusset 32 is slightly taller than flange 30 which provides for a slight pitch to floor 20 towards drain holes 34 on the outside edges of floor 20 to facilitate the draining of any moisture which may enter the pet enclosure. This drainage of moisture through drain holes 34 in conjunction with floor 20 being elevated by flange 30 and gusset 32 creates a dead air space below floor 20 for added insulation against the elements.

Back wall 22 is a solid wall having a plurality of hinge pins 40 molded into its upper edge. Hinge pins 40 are used to hingedly secure roof 14 to base 12 as will be described later herein.

Front wall 24 includes a generally trapezoidal opening 42 which provides for a portion of the opening for entrance into pet enclosure 10 by the pet. A flange 44 extends along the entire edge of opening 42 to provide strength and stability to opening 42. The upper edge of front wall 24 has a pair of apertures 46 molded into base 12 to facilitate the locking of roof 14 to base 12 as will be described later herein.

Side wall 26 includes a pair of T-shaped apertures 48 which are adapted to receive a pair of T-shaped tabs 50 molded onto a feed and water bowl assembly 52. Apertures 48 receive the upper portion of tabs 50 through the upper portion of the T and lock tabs 50 within apertures 48 when tabs 50 are moved to the lower portion of the T. Thus, bowl assembly 52 can be removed from side wall 26 simply and easily for cleaning or refilling.

Roof 14 is a gable styled roof having a front gabled end 60, a rear gabled end 62 and an integrally formed chimney 64. One side of roof 14 includes a roof extension 66 which, when roof 14 is assembled to base 12, will extend over bowl assembly 52 to protect bowl assembly 52 from the elements. Front gabled end 60 defines a generally triangular shaped opening 68 which is designed to mate with trapezoidal opening 42 in base 14 to complete the entrance way for the pet. An integral roof overhang 70 extends from the edges of opening 68 and helps to keep the elements including sun, rain and snow from entering pet enclosure 10. A clear flexible plastic door curtain 72 may be removably attached to front gabled end 60 and allowed to hang from gabled end 60 in front of openings 42 and 68 to help keep out cold winds and blowing snow. Curtain 72 may then be removed in the warmer weather to improve ventilation of pet enclosure 10. The lower edge of front gabled end 60 includes a pair of locking tabs 74 which are adapted to mate with the pair of apertures 46 molded into front wall 24 to lock roof 14 to base 12 as will be discussed later herein.

Rear gabled end 62 is a generally solid gabled end having a plurality of hinge hooks 76 molded into its lower edge. The plurality of hinge hooks 76 are adapted to mate with the plurality of hinge pins 40 formed into back wall 22 to hingedly attach roof 14 to base 12 as will be discussed later herein.

Figure 6:
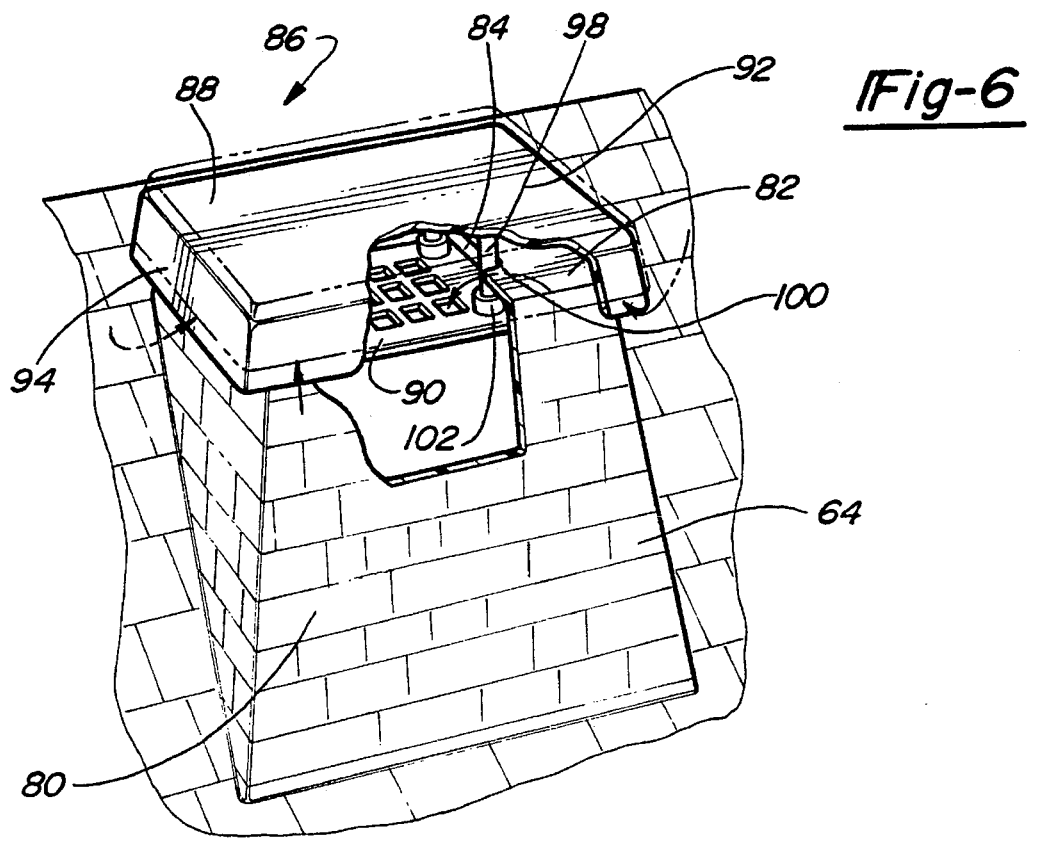
FIG. 6 is a detailed, partial cut away view of the chimney ventilation system of the present invention.

Chimney 64 improves the overall appearance of pet enclosure 10 while at the same time, chimney 64 provides for the ventilation of the internal area of pet enclosure 10. Chimney 64 is formed as an integral part of roof 14 and includes a generally rectangular upstanding base 80 having a flat cover 82. Flat cover 82 defines a through aperture 84 which places the interior of pet enclosure 10 in communication with the exterior atmosphere surrounding pet enclosure 10. As best seen in FIG. 6, chimney 64 is provided with a cover assembly 86 which is movable between an open and a closed position as shown in phantom in FIG. 6.

Cover assembly 86 prevents entry of rain or snow into the interior of pet enclosure 10 through chimney 64 when it is in either the open or the closed position. Cover assembly 86 includes an exterior cover 88 and an interior guard 90. Exterior cover 88 includes a flat exterior plate 92 having a downwardly extending flange 94 located around the entire circumference of plate 92. Exterior plate 92 is sized such that when exterior cover 88 is placed over chimney 64, flange 94 extends below flat cover 82 of chimney 64 to surround a portion of upstanding base 80 of chimney 64. A gap is formed between flange 94 and base 80 to provide for air flow for the venting of pet enclosure 10. A plurality of guides 98 extend from plate 92 and are received in corresponding apertures 100 extending through flat cover 82. Interior guard 90 has a corresponding plurality of guides 102 which mate with the plurality of guides 98 to secure interior guide 90 to exterior cover 88 by using a plurality of screws 104 or by other means known well in the art. The plurality of guides 102 are sized such that they do not fit through the corresponding apertures 100 and thus they act as stops when cover assembly 86 is placed in the upward or open position.

Cover assembly 86 is movable between a closed position and an open position. The closed position is obtained when flat plate 92 is in contact with the exterior surface of flat cover 82 of chimney 64. When in this position, air flow from the interior of pet enclosure 10 through aperture 84 in chimney 64 is prohibited. When cover assembly 86 is in this closed position, there is a clearance between guides 102 and the interior side of flat cover 82. The open position for cover assembly 86 is obtained by pulling up on cover assembly 86 causing cover assembly 86 to slide along guides 98 and eliminating the clearance between guides 102 and the interior side of flat cover 82. Cover assembly 86 will continue to move upward until guides 102 contact the interior side of cover 82. The amount of movement of cover assembly 86 is less than the length of flange 94 thereby insuring that the interior of pet enclosure 10 will always be shielded from rain or snow entering through chimney 64 when cover assembly 86 is in both the open and the closed positions. Air within the interior of pet enclosure 10 is then allowed to move through aperture 84 in chimney 64, between flat plate 92 and flat cover 82 through the gap between flange 94 and base 80 and into the exterior atmosphere.

Thus, pet enclosure 10 allows the pet owner to adjust the ventilation of the interior of pet enclosure 10 to suit the outside environment. On cold winter days, cover assembly 86 can be closed and plastic door curtain 72 may be installed to limit the venting of the interior of pet enclosure 10. This, in conjunction with the air gap provided under floor 20 and a pad 104 provide the warmest environment for the pet. During extreme cold weather, a heating element 106 may be included within pad 104. Heating element 106 is approximately ⅓ of the size of pad 104 which allows the pet to move on and off of heating element 106 within pet enclosure 10 as temperatures change. Heating element 106 is temperature controlled to maintain an approximate temperature of 103° F. which is the normal body temperature for an animal such as a dog and thus provides for the greatest comfort for the animal. Power is supplied to heating element 106 through an electrical cord 108 which extends through a knockout (not shown) in floor 20 and through an access groove 110 formed within flange 30. Electrical cord 108 is provided with a plug 112 which includes Ground Fault Interrupt (GFI) circuitry.

Figure 7:
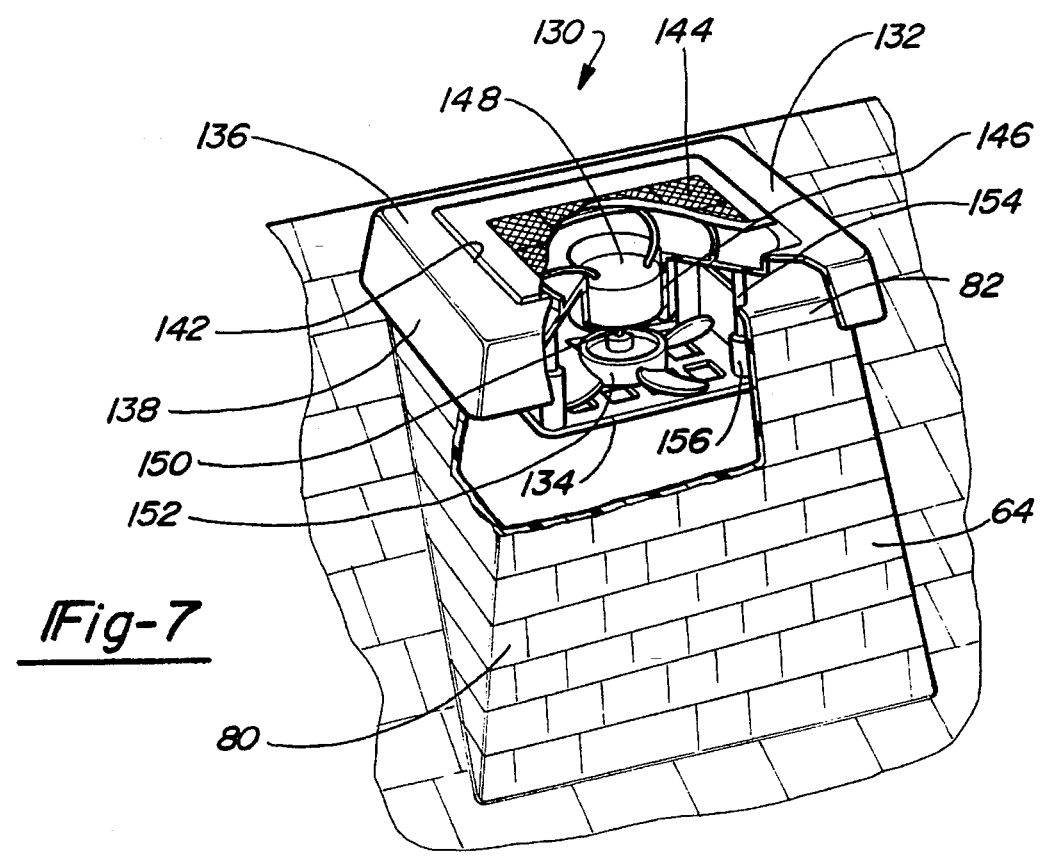
FIG. 7 is a view similar to FIG. 6 but showing a solar powered chimney ventilation system.

FIG. 7 shows another embodiment of a cover assembly 130 which includes a solar powered ventilation fan. Cover assembly 130 is also movable between an open and a closed position similar to that of cover assembly 86. Cover assembly 130 includes an exterior cover 132 and an interior guard 134. Exterior cover 132 includes an exterior plate 136 having a downwardly extending flange 138 located around the entire circumference of plate 136. Exterior plate 136, similar to exterior plate 92, is sized such that when exterior cover 132 is placed over chimney 64, flange 138 extends below flat cover 82 of chimney 64 to surround a portion of upstanding base 80 of chimney 64. A gap is formed between flange 138 and base 80 to provide for an air flow for the venting of pet enclosure 10 similar to that described above. The center of plate 136 defines a pocket 142 within which a plurality of solar cells 144 is located. Pocket 142 includes a centrally located cylindrical shaped pocket 146 extending downward through aperture 84 in chimney 64. An electric motor 148 is disposed within pocket 146 and is powered by solar cells 144. Motor 148 includes a driveshaft 150 extending into chimney 64 onto which is fixedly secured a fan 152. When solar cells 144 are exposed to a sufficient amount of sunlight, solar cells 144 convert this sunlight into electrical energy to power motor 144 and rotate fan 152 to aid in the venting of pet enclosure 10.

A plurality of guides 154 extend from flat plate 136 similar to guides 98 described above and are received in apertures 100. Interior guard 134 has a corresponding plurality of guides 156 which mate with the plurality of guides 154 to secure interior guard 134 to exterior cover 132 by using the plurality of screws 104 or by other means known well in the art. The plurality of guides 156 are sized such that they do not fit through the corresponding apertures 100 and thus they act as stops when cover assembly 130 is placed in the open position.

Cover assembly 130 is movable between a closed position and an open position. The closed position is obtained when flat plate 136 is in contact with the external surface of flat cover 82 of chimney 64. When in this position, air flow from the interior of pet enclosure 10 through aperture 84 in chimney 64 is prohibited. When cover assembly 130 is in this closed position, there is a clearance between guides 156 and the interior side of flat cover 82. The open position for cover assembly 130 is obtained by pulling up on cover assembly 130 causing cover assembly 130 to slide along guides 154 and eliminating the clearance between guides 156 and the interior surface of flat cover 82. Cover assembly 130 will continue to move upward until guides 156 contact the interior of flat cover 82. Similar to cover assembly 86, the amount of movement of cover assembly 130 is less than the length of flange 138 thereby insuring that the interior of pet enclosure 10 will be shielded from rain and snow entering through chimney 64 when cover assembly 130 is in both the open and the closed positions. When cover assembly 130 is in the open position, air within the interior of pet enclosure 10 is allowed to move through aperture 84 in chimney 64, between exterior plate 136 and flat cover 82, through the gap between flange 138 and base 80 and into the exterior atmosphere. When there is sufficient sunlight to operate motor 148 and thus rotate fan 152, the air within pet enclosure 10 is pumped out through chimney 64 by fan 152. In bright sunlight, fan 152 has the capacity to replace the air within pet enclosure 10 approximately every three minutes. The electrical circuitry between solar cells 144 and motor 148 may be provided with a temperature sensor to discontinue the operation of motor 148 below a specified temperature if desired. In the preferred embodiment, motor 148 will not operate below 60° F.

The assembly of base 12 and roof 14 is a simple procedure. First base 12 is placed right side up on a supporting surface. Next, roof 14 is placed upside down adjacent to base 12 with rear gabled end 62 being adjacent to back wall 22. The plurality of hinge hooks 76 are engaged with the plurality of hinge pins 40 to form a plurality of hinges and roof 14 is pivoted approximately 180° such that roof 14 is now on top of base 12. To complete the assembly, the pair of locking tabs 74 located on front gabled end 60 are inserted through the pair of apertures 46 located on front wall 24 and snapped into place to lock roof 14 to base 12. When it becomes necessary to open pet enclosure 10 in order to attach or remove door curtain 72, to install or remove pad 104, to clean pet enclosure 10 or to simply gain unlimited access to pet enclosure 10, locking tabs 74 are released from apertures 46 and roof 14 is rotated off of base 12.

While base 12 and roof 14 can be made from a variety of materials, it has been found that a copolymer plastic which is impervious to ticks and fleas has performed the best. By being impervious to fleas and ticks, these pests will not remain in the pet enclosure if they are initially brought into the pet enclosure by the pet.

While the above detailed description describes the preferred embodiment of the present invention, it should be understood that the present invention is susceptible to modification, variation and alteration without deviating from the scope and fair meaning of the subjoined claims.

What is claimed is:

1. A pet enclosure comprising:

a base having a floor, a front wall, a rear wall and at least two side walls, said base defining an internal chamber and at least one unitary locking aperture formed on said base, at least one unitary hinge element formed on one of said walls, a doorway opening in one of said walls and adjacent said floor for enabling passage of a pet in and out of said internal chamber, a roof pivotally secured to said base by at least one complementary unitary hinge element formed on said roof, said hinge elements interconnecting to form at least one hinge, said roof being movable between an open and a closed position, said roof defining at least one unitarily formed locking tab for engagement with said locking aperture of said base to lock said roof into said closed position.

2. The pet enclosure according to claim 1 wherein said front wall defines a first opening to allow access to said internal chamber.

3. The pet enclosure according to claim 2 wherein said roof defines a second opening, said second opening communicating with said first opening to allow access to said internal chamber.

4. The pet enclosure according to claim 3 wherein said roof includes a roof overhang disposed adjacent to said second opening.

5. The pet enclosure according to claim 1 wherein said roof includes a chimney, said chimney defining a vent for venting said internal chamber.

6. The pet enclosure according to claim 5 wherein said vent is movable between an open and a closed position.

7. The pet enclosure according to claim 5 wherein said vent includes a powered fan.

8. The pet enclosure according to claim 7 wherein said fan is solar powered.

9. The pet enclosure according to claim 1 wherein said at least one hinge is a releasable hinge in order to allow the separation of said roof from said base.

10. The pet enclosure according to claim 1 further comprising a bowl assembly releasably secured to an external surface of said base such that said bowl assembly is outside of said internal chamber enabling access to said bowl assembly from outside of said pet enclosure.

11. A pet enclosure comprising:

a single piece base having a floor, a front wall, a rear wall and at least two side walls, said base defining an internal chamber and at least one unitary locking aperture formed on said base, at least one unitary hinge element formed on one of said walls, a doorway opening in one of said walls and adjacent said floor for enabling passage of a pet in and out of said internal chamber, a single piece gabled roof having a roof section, a front gabled end and a rear gabled end, said gabled roof pivotally secured to said base by at least one complementary unitary hinge element formed on said roof, said hinge elements interconnecting to form at least one hinge, said roof being movable between an open and a closed position and defining at least one locking tab for engagement with said locking aperture of said base to lock said roof in said closed position.

12. The pet enclosure according to claim 11 wherein said front wall defines a first opening to allow access to said internal chamber.

13. The pet enclosure according to claim 12 wherein said front gabled end defines a second opening, said second opening communicating with said first opening to allow access to said internal chamber.

14. The pet enclosure according to claim 13 wherein said front gabled end includes a roof overhang disposed adjacent to said second opening.

15. The pet enclosure according to claim 11 wherein said roof includes a chimney, said chimney defining a vent for venting said internal chamber.

16. The pet enclosure according to claim 15 wherein said vent is movable between an open and a closed position.

17. The pet enclosure according to claim 15 wherein said vent includes a powered fan.

18. The pet enclosure according to claim 17 wherein said fan is solar powered.

19. The pet enclosure according to claim 11 wherein said at least one hinge is a releasable hinge in order to allow the separation of said roof from said base.

20. The pet enclosure according to claim 11 further comprising a bowl assembly releasably secured to an external surface of said base such that said bowl assembly is outside of said internal chamber enabling access to said bowl assembly from outside of said pet enclosure.

21. A pet enclosure comprising:

a base having a floor, a front wall, a rear wall and at least two side walls, said base defining an internal chamber, a doorway opening in one of said walls and adjacent said floor for enabling passage of a pet in and out of said internal chamber;

a roof secured to said base; and a bowl releasably secured to an external surface of said base in a position which is elevated relative to said floor of said base such that said bowl assembly is outside of said internal chamber enabling access to said bowl assembly from outside of said met enclosure.

* * * * *

UNITED STATES PATENT AND TRADEMARK OFFICE
CERTIFICATE OF CORRECTION

PATENT NO. : 5,551,371
DATED : September 3, 1996
INVENTOR(S) : Dennis P. Markey et al It is certified that error appears in the above-indentified patent and that said Letters Patent is hereby corrected as shown below:

On title page, [54] Title, line 2, "PASSING" should be --PASSAGE--

On title page, [75] Inventors, lines 3-4, "Philip Swinhart" should be --Phillip Swihart--

On title page, [75] Inventors, lines 4-5, "Ron Rensberger" should be --Ronald Ernsberger--

Col. 1, line 2, "PASSING" should be "PASSAGE"

Col. 1, line 9, "net" should be --pet--

Col. 1, line 30, ":needed" should be --needed--

Col. 3, line 8, "fiat" should be --flat--

Col. 3, line 37, "fiat" should be --flat--

Col. 3, line 37, "fiat" should be --flat--

Col. 6, line 65, claim 21, "met" should be --pet--

Signed and Sealed this

Fifteenth Day of April, 1997

*Attest:*

BRUCE LEHMAN

*Attesting Officer*     *Commissioner of Patents and Trademarks*